(No Model.) 2 Sheets—Sheet 1.

P. PHILLIPS.
MITERING MACHINE.

No. 473,429. Patented Apr. 19, 1892.

Witnesses

Inventor
Peter Phillips
by
Donald C. Ridout & Co.
Atty's (No Model.) 2 Sheets—Sheet 2.

P. PHILLIPS.
MITERING MACHINE.

No. 473,429. Patented Apr. 19, 1892.

Witnesses
S. Edw. Maybee
F. A. Woodward

Inventor
Peter Phillips
by
Donald C. Ridout & Co.
Att'ys

UNITED STATES PATENT OFFICE.

PETER PHILLIPS, OF TORONTO JUNCTION, CANADA, ASSIGNOR TO SOLOMON PHILLIPS, OF SAME PLACE.

MITERING-MACHINE.

SPECIFICATION forming part of Letters Patent No. 473,429, dated April 19, 1892.

Application filed August 21, 1891. Serial No. 403,288. (No model.)

*To all whom it may concern:*

Be it known that I, PETER PHILLIPS, of the town of Toronto Junction, in the county of York, in the Province of Ontario, Canada, have invented a certain new and useful Improvement in Mitering-Machines, of which the following is a specification.

My invention relates particularly to a machine for cutting miters and kindred formations of wood; and the objects of the invention are, first, to provide a machine to cut in a vertical plane, said vertical plane being readily adjustable to any desired angle with the direction of the work operated on; secondly, to provide a machine to cut at any desired angle from the vertical plane and at the same time at a right or any desired angle to the work.

I attain the above objects by means of the mechanism illustrated in the accompanying drawings, in which similar letters of reference refer to similar parts throughout.

Figure 1:
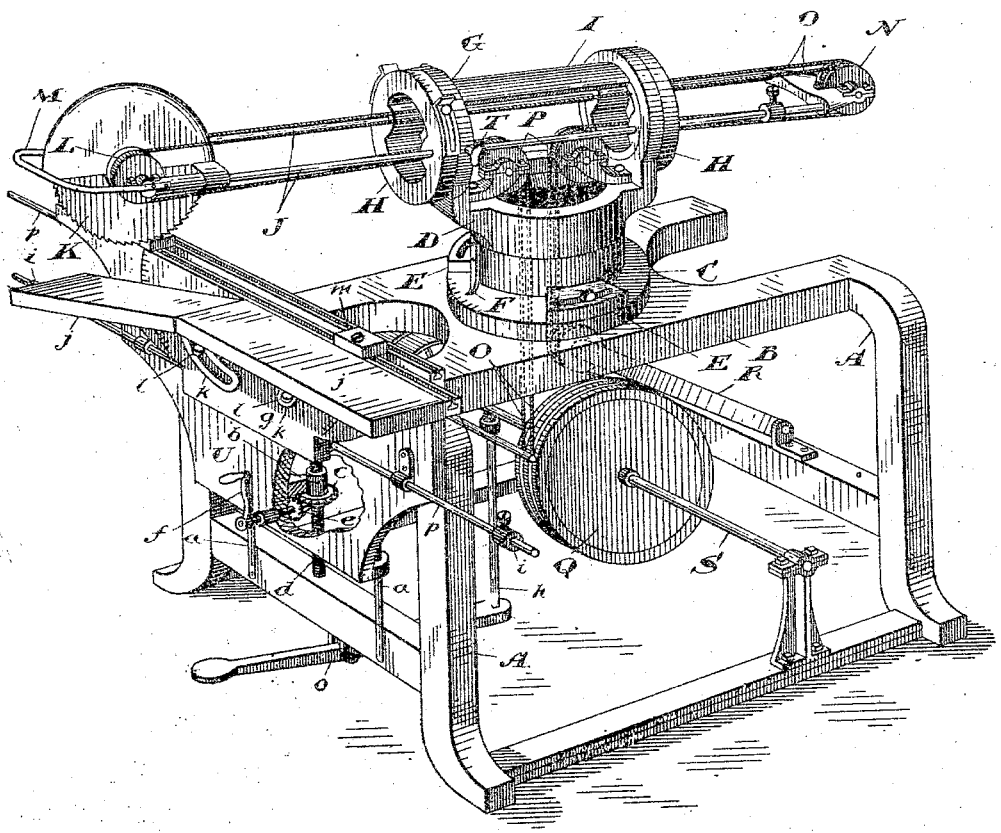
Figure 2:
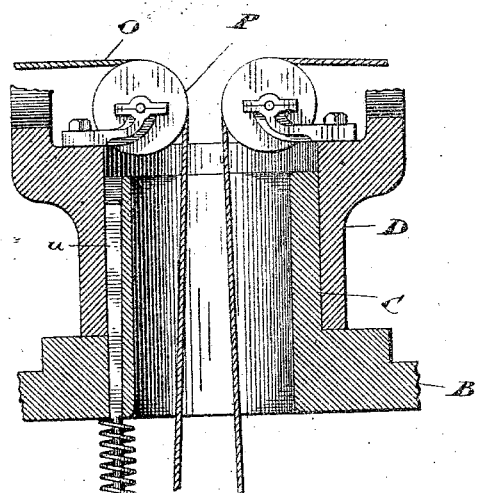
Figure 3:
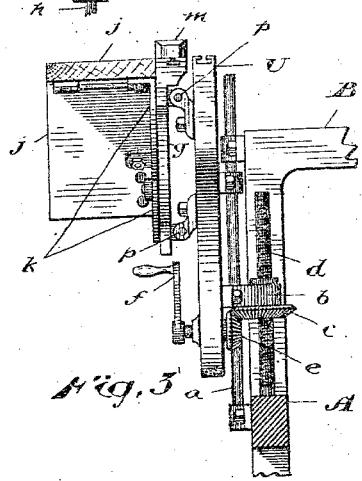

Figure 1 is a perspective view of my machine, partially broken away to show the construction. Fig. 2 is a sectional detail showing the means of clamping the saw-frame at any angle desired. Fig. 3 is a detail in elevation of the table-adjusting mechanism.

In the drawings, A is the main frame of the machine, carrying a bed-plate B, which supports at its center a hollow cylindrical bearing C. On the bearing C is supported the swinging frame D, which at its lower cylindrical portion is neatly fitted over the bearing C and adjustably secured thereon by bolts or thumb-screws passing through the slotted lugs E, which are fast to or form part of the swinging frame D. At the front of the bearing C is a scale of degrees as a guide to the angle of inclination of the frame D, right or left from the initial or center line of the machine. An index-pointer F, secured on the frame D at the front, is provided or any other suitable indicator. The frame D supports in suitable bearings the horizontal frame G, composed of the circular heads H, and the connecting-bar I along the top, securing the heads H together. About the center of the height of the heads H are supported the sliding parallel rods J, which extend, as shown, to support a circular saw K in suitable bearings at the front and having pulleys L on each side of the said saw K and on the same axle. The saw K is provided with a guard to prevent accidents.

The handle M, attached to the rods J and extending in front of the saw K, is the means by which the saw K and the rods J supporting it are guided. On the rear ends of the rods J a pulley N is supported in suitable bearing to carry the belts O over from the pulleys L of the saw K. The belts O, I prefer to use double, as shown, though for light work one belt would, I consider, be quite sufficient. The belts O, after passing over the pulleys L and N, respectively, at front and rear ends of the rods J, are then carried over guide-pulleys P, located, as shown, over the central opening of the frame D and close together at the center of said opening, so as to equalize the length of the belts O as nearly as possible and compensate for the various angles in which the pulleys L and N on the rods J may be placed. Said guide-pulleys P are carried in suitable bearings secured to the frame D. The belts O are driven by the pulley Q, carried on the main driving-shaft S, mounted in suitable bearings on the main frame. To take up slack in the belts O, a tightener-frame R, hinged to the main frame A and located over the pulley Q, is provided, having a pulley or pulleys therein to ride on the belts O. The shaft S derives its motion from any suitable source of power. On the top of the front head H a scale of degrees, similar to the scale on the bearing C, is provided to read to each side of the center line, which indicates the vertical position of the saw K and which may be indicated by a pointer on the bearing.

To secure the heads H, rods J, and mechanism carried thereby in position, as desired, a clamp-screw T is secured in the front bearing to engage the corresponding head H, a portion of which extends within said bearing. On one of the rods J an adjustable collar is provided to form a stop to limit the travel of the rods J forward, as may be necessary in certain work.

On the front of the main frame A is the elevating-plate U, sliding on suitable guide-rods *a*. To the back of the elevating-plate U, a journal-bearing $b$ is secured supporting a bevel-pinion $c$, which has an internally-screw-threaded hole through its center. Through this pinion $c$ passes a screw $d$, attached to the main frame A at its lower end. A bevel-pinion $e$, operated by a crank-handle or hand-wheel $f$, engages with the bevel-pinion $c$, and consequently by operating the said crank-handle the plate U may be elevated or depressed for the purpose of bringing the work placed on the table $j$, hereinafter described, to the desired relative height with respect to the saw K. On the front of the plate U a plate $g$ is movably supported on guide-rods $p$. On one guide-rod $p$ adjustable collars $i$ are provided to form stops to regulate the transverse motion of the plate $g$ along the plate U.

The table $j$ consists of two parts hinged together at the center of the upper edge of the plate $g$, on which it is supported. On each part of the table $j$ a sector $k$ is secured, having a central opening radial from the hinge and in which suitable clamping-screws $l$ are provided to clamp the part of the table at any desired angle of descent, which is denoted by scales of degrees similar to the scales hereinbefore referred to. In the upper edges of both the plates U and $g$ are formed T-channels, as a means by which stops $m$ or guide-pieces are secured to rest the work against when being operated on. To secure the frame D in any position, a wedge or key $u$, connected to the pedal $o$ by a rod $h$, having a spiral spring $q$ thereon, is provided, the key $u$ being placed in a groove for its reception in the outside of the bearing C, and is wedged against the inner surface of the frame D by the downward motion of the spring $q$, which presses against the under side of the bed-plate B. In order to take up any slack in the belts O, farther than is provided for by the tightener-frame K, the bearings of the main shaft S may be made vertically adjustable.

What I claim as my invention is—

1. A circular saw suitably journaled on the end of two parallel rods supported by and longitudinally adjustable in a revoluble frame carried by a frame revoluble at right angles to the frame supporting the parallel rods, in combination with means for holding the revoluble frames at such angles as they may be independently set, substantially as and for the purpose specified.

2. A circular saw suitably journaled on the end of two parallel rods supported by and longitudinally adjustable in a revoluble frame carried by a frame revoluble at right angles to the frame supporting the rods, in combination with a wedge-key operated by a treadle and arranged to lock the revoluble rod-frame, substantially as and for the purpose specified.

3. A divided saw-table hinged upon the face of a plate vertically and horizontally adjustable upon the frame of the machine, in combination with means for independently locking each wing of the divided table at any desired angle, substantially as and for the purpose specified.

Toronto Junction, July 25, 1891.

PETER PHILLIPS.

In presence of—
HENRY C. FOWLER,
SOLOMON PHILLIPS.